May 5, 1959 T. HINDMARCH 2,885,031
FLUID PRESSURE OPERATED BRAKE STRUCTURE
Filed Sept. 16, 1954
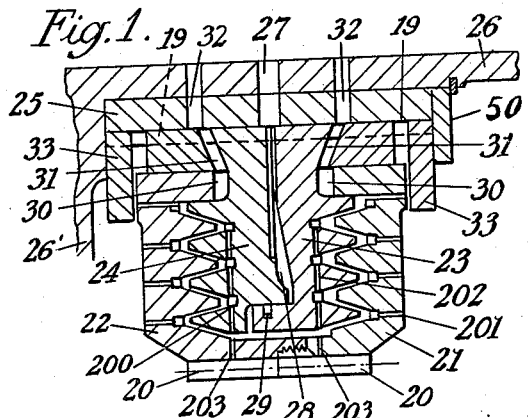
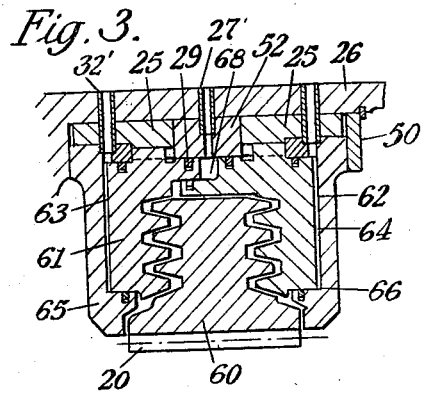
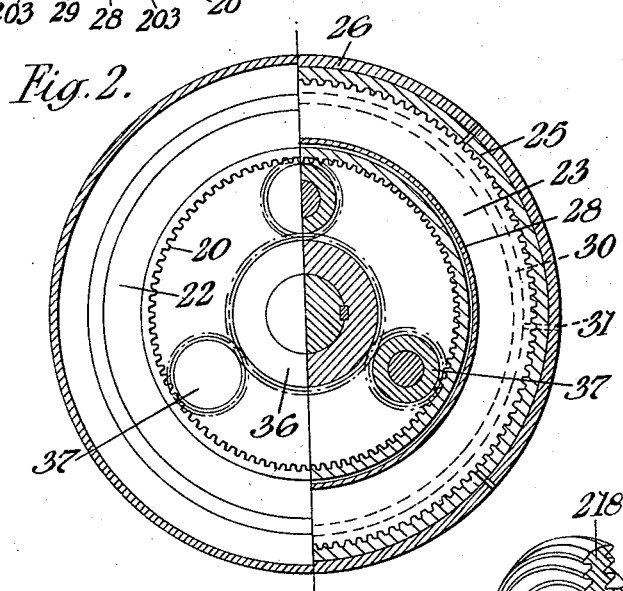
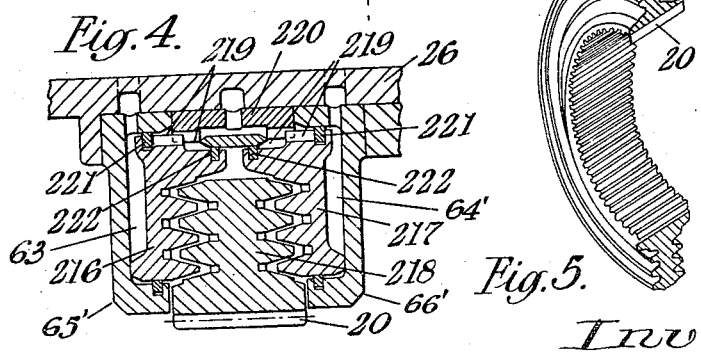
Inventor
T. Hindmarch
By Glascock Downing Seibold
Attys.

United States Patent Office 2,885,031
Patented May 5, 1959

2,885,031

FLUID PRESSURE OPERATED BRAKE STRUCTURE

Thomas Hindmarch, Chesham, England

Application September 16, 1954, Serial No. 456,488

Claims priority, application Great Britain September 17, 1953

17 Claims. (Cl. 188—72)

The present invention relates broadly to the art of brake mechanisms.

More particularly, this invention relates to a fluid pressure-operated brake structure.

Specifically, the invention is directed to an improved combined gear and brake structure incorporated in an epicyclic gearing arrangement.

Accordingly, the invention has for an object to provide an axially compact, economically constructed fluid pressure operated friction brake structure combined with a casing means in which the brake structure includes cooperating annular means having facing inner engaging friction surfaces and in which one of said annular means is rotatable while the other is supported and guided by the casing means for axial movement only, and with both annular means being located at the inner circumference of the casing means.

It is a specific object of the invention to provide such a brake structure in association with an epicyclic gearing means mounted for rotation within the casing means and including a sun gear means, planet carrier means, and planet gear means on the planet carrier means and in engagement with the sun gear means, with one of said last-mentioned means being in toothed engagement with an internally toothed gear so as to rotatably support the same within the casing, said internally toothed gear constituting the annular means of the brake structure that is mounted for rotary movement, whereas the other annular means of the brake structure is splined or otherwise coupled to the casing means for axial movement only, fluid pressure-receiving chamber means being associated with the axially movable annular means for positively moving the same in at least one direction and further means such as an additional fluid pressure-receiving chamber means being associated with the axially movable annular means of the brake structure to move the same axially in the opposite direction.

Consistent with the foregoing object, the invention provides an axially compact fluid pressure-operated brake arrangement which includes two axially movable rings for cooperation with a ring gear having a portion extending radially outwards of the teeth and provided with shaped friction surfaces for cooperation with similarly shaped friction surfaces on the two rings. The rings may be constructed of bronze or similar material, while the said portion of the ring gear is of steel or similar material. The ring gear may be U-shaped in cross section and have two axially spaced flange portions, the facing surfaces of which are provided with grooves and the two axially movable rings are mounted in back to back relationship between said flange portions, and have grooved surfaces facing the restrictive flange portions so that they move apart to engage the flange portions. Thus, there is provided an internally expanding brake structure. Alternatively, the ring gear may have oppositely facing, axially spaced, grooved surfaces radially outwards of the teeth of the gear and the two axially movable rings are mounted for axial movement toward one another from opposite sides of said axially spaced surfaces so that the brake structure is an external contracting brake.

It is, therefore, an object of the invention to provide a combined gear and brake assembly including a casing means having therein an axially compact arrangement of parts including a ring gear that is to be braked and annular axially movable braking means, the gear and braking means having complementary, inter-engaging, shaped friction surfaces, the braking assembly being supported in the casing against undue axial displacement, fluid pressure-receiving chamber means being associated with the braking means, so that admission of fluid therein moves the braking means and only radial port means being provided through the casing means to accommodate supply and discharge of fluid.

Specifically, the invention has for an object to provide a combined gear and brake structure that is axially compact, and which is especially suitable for incorporation into an epicyclic gearing arrangement, whereby the gearing arrangement as regards its overall dimensions is so constructed and arranged that the dimensions of the casing accommodating the gearing and brake assembly, in the direction transverse to the axes of the shafts supporting the gears is only slightly in excess of the overall transverse dimensions of the gearing per se. This feature provides for completely enclosing an epicyclic transmission in an oil tight casing and further enhancing accessibility characteristics, as well as making it possible to assemble plural epicyclic gear trains in axial alignment within an enclosed oil tight casing of minimum dimensions. Consequently, by utilizing an axially compact combined gear and brake structure in accordance with the invention, the maximum utilization of space is facilitated.

Further and more specific objects will be apparent from the following description taken in connection with the accompanying drawings in which:

Figure 1 is a fragmentary cross-sectional view illustrating one form of the invention.

Figure 2 is a view partly in section and partly in elevation illustrating a combined epicyclic gearing and brake structure with the brake structure being similar to the arrangement shown in Figure 1.

Figures 3 and 4 are views similar to Figure 1 but illustrating a modified form of brake structure in which the rotatable annular gear is associated between a pair of axially movable annular brake rings or elements in a manner to constitute an external contracting brake relationship.

Figure 5 is a fragmentary perspective view illustrating the annular gear shown in the brake structure of Figure 4.

In connection with the illustrated embodiments of the invention, Figure 1 is directed to a combined gear and brake structure that is of the internal expanding type in that the axially movable elements are mounted in back to back relationship and move apart to engage radially disposed, axially spaced, oppositely facing flange means incorporated with an annular or ring gear. The arrangements of Figures 3 and 4 relate to forms of brake structure that are termed externally contracting, in that the annular gear has oppositely facing surfaces radially outwards of the teeth for cooperation with a pair of axially movable rings that move toward the gear to brake-engaging condition.

Further, it is to be pointed out that the invention templates utilizing the same oil for operating the brake that is used for lubricating the gears on other rotary parts associated therewith. The complete oil circuit is not illustrated in the drawing, but it is believed clear that the necessary pressure for effecting operation of the movable components of the brake structure can be provided either by a separate source of fluid under pressure or by means of a pressure pump driven from the input shaft of the gearing. In the latter instance, the oil will be drawn from a reservoir via a filter and delivered via a pressure relief valve to a suitable control valve mechanism and thence by suitable conduit means to the radial ports associated with the casing. The specific form of structure of the control valve means will obviously vary in accordance with the use to which the assembly of the invention is put and the number of assemblies incorporated in the arrangement. Since these components of the overall fluid operated system form no part of the present invention, they have not been illustrated, it being well within the skill of the art to suitably vary and alter the fluid supply and delivery circuit in accordance with the purpose and the result to be obtained.

Figure 1 illustrates a brake assembly as applied to an epicyclic gearing such as shown in Figure 2. The annulus gear includes teeth 20 formed on its inner periphery and axially spaced inter-connected outer brake members 21 and 22. Obviously, the teeth can be formed on a separate ring which is in turn connected with the two outer brake members. The inner brake members are mounted to slide axially, but are prevented from rotation by splines, serrations, keys or the like as shown at 19. Thus, complemental means are provided on the outer periphery of the brake members 23 and 24 and on the inner periphery of the casing for supporting and guiding the axially movable brake members relative to the opposed surfaces of the outer brake members 21 and 22. In the form illustrated, the casing is denoted at 26 and a mounting ring at 25 is secured to the inner wall of the casing, and has the keys or serrations 19 provided on its inner surface. Since the mounting ring 25 is secured to the interior of the casing 26, the broader terminology of casing means is applicable to this assembly of ring and casing. The inner members 23, 24 have V-shaped grooves and projections formed on their outer faces which engage with corresponding projections and grooves formed on the inner faces of the outer members 21 and 22 when the inner members 23 and 24 are moved outwards to engage the brake by means of fluid pressure supplied through radial port 27 to the chamber 28 defined between the facing surfaces of the inner members 23 and 24. Seal means such as a ring 29 are disposed between the telescoping surfaces of the inner brake members 23 and 24. The brake is disengaged by fluid pressure applied to the two chambers 30, formed between inner and outer members, through ports 31 in the inner members and radial ports 32 in the mounting ring 25 and casing 26. The fluid pressure for disengagement may be applied only when disengagement is required or may be applied all the time, when, during engagement, its effect is overcome by the much greater area over which the engagement pressure is applied. The ports 31 and 32 may be so positioned relative to one another that should one of the inner members move beyond the central position in disengagement, the fluid pressure to the corresponding chamber 30 is cut off. The annulus and outer member assembly is prevented from axial movement by abutment members 33. In the illustrated example, the lefthand abutment member 33 bears against one end wall 26' of the casing, whereas the righthand abutment member or ring 33 is backed up by another ring 50 that is suitably secured to the inner surface of the casing and mounted against axial movement. Obviously, where the gearing assembly within the casing includes plural axially aligned epicyclic gear trains, the assembly of brake members have their abutment members 33 backed up by rings 50 at each end of the assembly, where the particular gear train is intermediate the ends of the casing.

It will be appreciated that in large size units there can be a considerable leakage of fluid along the spline or serrations. My invention contemplates preventing leakage by mounting seal means such as piston rings, not shown, bearing on a plain surface portion of bearing ring 25. Seal rings of this type are shown at 29' in the form of invention illustrated in Figure 3.

The above form of the invention shows the engagement of the brake by the inner members moving outwards, but I can also cause the two outer members to move inwards as shown in Figures 3 and 4. Thus, the invention contemplates an external contracting brake assembly. The inner brake member 60, which is part of or attached to the annulus gear 20, has V-grooves formed on either side and extending in opposite directions, see Figure 3. The outer brake members 61, 62 which are keyed or splined to mounting sleeve 25, are forced toward one another and so into engagement with the member 60 by means of fluid pressure applied to the chambers 63, 64 and contained between the outer brake members and the abutment members 65, 66. Disengagement is effected by fluid pressure supplied to chamber 68 defined between the facing surfaces of the outer sliding members and the mounting ring.

In this form of the invention, the abutment members 65, 66 are shaped to slidably accommodate the movable members 61 and 62. A radially extending mounting ring 51 backs up the righthand abutment member 66, while the opposite abutment member 65 bears against the end wall of the casing. The mounting ring 25 is in two parts separated by an additional ring 52 having a smooth inner surface for cooperation with portions of the outer periphery of the movable members 61, 62. Suitable sealing rings 29' carried by the members 61, 62 bear against the inner surface of ring 52. The radial port 27' includes a communication through ring 52 with the chamber 68 and other radial ports 32' communicate with chambers 63, 64.

Figure 4 is a cross-sectional view of a form similar to Figure 3 in which the sliding brake members 216 and 217 move toward the grooved extension 218 of the annulus having the internal teeth 20. These sliding brake members are accommodated by radially extending abutment means 65', 66' which are U-shaped in cross section. The casing sleeve or mounting ring 220 is provided with internal splines that are preferably involute in form and cooperate with other splines on the outer periphery of the brake members 216, 217. The ring 220 is suitablby ported so that pressure fluid can pass to the chambers 219 defined between the ring 220, the surfaces of the sliding brake members and sealing rings 221 and 222 which are of different diameters. Additionally, the inner flanges of the members 65', 66' are provided with radial ports which communicate with the respective fluid entry ports so that fluid can enter the chambers 63', 64' defined between the facing surfaces of the respective brake members and abutment elements.

Figure 5 is a fragmentary perspective view clearly illustrating the shape of the ring gear employed in the forms of the invention shown in Figures 3 and 4.

Figure 2 illustrates an epicyclic gearing partly in section and partly in elevation. This structure is similar to the form shown in Figure 1 but the various bores such as 201 in Figure 1 are not shown. In Figure 2 the sun gear means is denoted at 36 and 37 denotes planet gear means in mesh with the teeth 20 on the ring gear. The remaining reference characters are directed to the corresponding parts shown in Figure 1.

When the brakes are disengaged and the brake rings or discs are separated, oil can accumulate between the engaging faces and some provision for relief of this oil should be provided. In Figure 1 relief is effected by providing rectangular annular grooves at the bottom of each V-shaped groove which are vented by axial bores 201 or radial bores 202 and 203.

In cases where it is desirable to use slow engagement of the brake it becomes necessary to supply a lubricant and coolant to the interengaging faces. This is accomplished by providing bores, not shown, leading from the fluid pressure chamber to the faces of the V-grooves, other relief bores being used to pass away the surplus and heated oil.

In cases where the engaging faces may have very little oil on them after a long period of disengagement, one manner of applying the necessary lubricant is by providing bores, not shown, leading from the pressure chamber to the bottom of the V-grooves so that when oil under pressure is fed to the chamber to engage the brake, some passes through these bores to the faces. The use of annular rectangular grooves and relief bores enables a circulatory system for cooling purposes to be arranged.

It is believed clear, therefore, that the present invention provides a brake structure which comprises the combination with a fixed casing means, considering the mounting ring as part of the casing, and having an axially extending circular inner surface, a first and second annular means. Complemental means are provided between the outer periphery of the first annular means and the inner surface for supporting and guiding the first annular means for only axial movement relative to and on the inner surface. The second annular means is concentric with the first annular means and the transmission components within the casing are so mounted as to have one of these components take part in the supporting of the second annular means for rotary movement closely adjacent the first annular means. The radial extent of the second annular means and the location of the transmission components bears such a relationship to the radial extent of the first annular means that the outer periphery of the second annular means, the ring gear, is inwardly of but adjacent the inner surface of the casing means, while the inner periphery of the second annular means is inwardly of but adjacent the inner periphery of the first annular means. This is true in all forms of the invention. In effect, therefore, both annular means, that is the braking element or elements on the one hand, and the element to be braked such as the ring gear of the epicyclic transmission, can be stated to be located at the inner circumference of the casing means. The respective facing radial surfaces of both annular means have integral, shaped, complemental, interengaging friction surfaces thereon, and means are provided for positively moving the first annular means in a direction to engage the element to be braked, and means are provided for positively moving the first annular means axially in a direction to disengage. The engaging and/or disengaging movement of the first annular means is effected by fluid pressure so that in all forms of the invention there is included a pressure fluid-receiving chamber means. Furthermore, there are at least two axially spaced fixed abutment elements extending radially inwards of the inner surface of the casing means for confining the assembly of annular means against undue axial displacement. The pressure fluid-receiving chamber means is located axially inwards of one or both of said abutments depending on the movement of braking elements involved and the casing means has at least one radial port therethrough terminating in communication with one end with the chamber and at its other end externally of the casing. This relationship of parts provides a very compact efficient friction brake and facilitates the assembly of a plurality of such brakes in a common casing of restricted axial dimensions, because the pressure fluid-receiving chamber or chambers are close to the inner circumference of the casing and the port or ports for conveying the fluid are nothing more than radial holes through the casing means.

The various embodiments shown are by way of illustration only and the details may be varied without departing from the scope of the invention.

I claim:

1. A brake structure comprising in combination a fixed casing means having an axially extending circular inner surface, a first annular means, complemental means between the outer periphery of the first annular means and said inner surface for supporting and guiding said first annular means for only axial movement relative to and on said inner surface, a second annular means, said second annular means being concentric with the first annular means, means for supporting said second annular means for rotary movement and for disposing the same closely adjacent said first annular means and including at least one component inside the casing radially inwards of said first annular means, the radial extent of said second annular means and the location of said component bearing such relationship to the radial extent of the first annular means that the outer periphery of the second annular means is inwardly of but adjacent said inner surface and the inner periphery of the second annular means is inwardly of but adjacent the inner periphery of the first annular means, so that both said annular means are located at the inner circumference of the casing means, the respective facing radial surfaces of both said annular means having integral, shaped, complemental, interengaging friction surfaces thereon, means for positively moving said first annular means axially to engage the respective friction surfaces, means for positively moving said first annular means axially to disengage said friction surfaces, one of said two last-mentioned means including a pressure fluid-receiving chamber means, at least two axially spaced abutment elements extending radially inwards of said inner surface for confining the assembly of both said annular means against undue axial displacement, said chamber means being located axially inwards of one of said abutment elements, and said casing means having at least one radial port therethrough terminating in communication with said chamber means at one end and externally of the casing means at its other end.

2. A brake structure comprising in combination, a fixed casing means having an axially extending circular inner surface, a first annular means, said first annular means having oppositely directed axially spaced surfaces having a series of circumferentially arranged V-grooves therein, means for supporting said first annular means for rotary movement and for locating the same with its outer periphery inwardly of but adjacent said inner surface, said last-mentioned means including at least one component inside the casing radially inwards of said first annular means, a pair of annular braking elements, complemental means between said inner surface and the outer periphery of the respective braking elements for mounting the braking elements for axial movement only on said inner surface, each braking element having a radial surface adjacent to one of the V-grooved surfaces of the first annular means and having a similar series of V-grooves therein defining projections accommodated within the V-grooves of said first annular means, at least two axially spaced fixed abutment elements extending radially inwards of said inner surface for confining the assembly of annular means and braking elements against undue axial displacement, means for positively moving said braking elements axially to frictionally engage said V-grooved surfaces, means for positively moving said braking elements axially to disengage said V-grooved surfaces, one of said two last-mentioned means including pressure fluid-receiving chamber means, said chamber means being located axially inwards of one of said abutment elements, and said casing means having at least one radial port therethrough terminating in communication with said chamber means at one end and externally of the casing means at its other end.

3. A brake structure as claimed in claim 2 in which said first annular means is U-shaped in cross section and the V-grooved surfaces thereof face one another, said braking elements being disposed in back to back relationship between said facing surfaces and being movable away from one another to engage said U-grooved surfaces and toward one another to disengage said V-grooved surfaces.

4. A brake structure as claimed in claim 3 and said pressure fluid-receiving chamber means including the mutually adjacent surfaces of said braking elements.

5. A brake structure as claimed in claim 4 and additional pressure fluid-receiving chamber means between the respective facing surfaces of said braking elements and said annular means and said casing means having additional radial ports therethrough in communication with said additional chamber means, whereby said braking elements are positively moved in both engaging and disengaging directions by admission of fluid under pressure and additional chamber means.

6. A brake structure as claimed in claim 2 in which said first annular means has oppositely facing V-grooves on its opposite axially spaced surfaces, respective braking elements being disposed adjacent the respective V-grooved surfaces on the first annular means and said braking elements being movable toward one another to engage said V-grooved surfaces and away from one another to disengage said V-grooved surfaces.

7. A brake structure as claimed in claim 6 in which said abutments are shaped to slidably accommodate the respective braking elements and to define in combination with said braking elements said pressure fluid-receiving chamber means so that there are at least two axially spaced chambers, and said casing means having at least one radial port therethrough terminating in communication with the respective chambers.

8. A brake structure as claimed in claim 7 and said braking elements having facing surfaces defining an additional pressure fluid-receiving chamber between the braking elements, and said casing means having at least one additional radial port therethrough terminating in communication with said additional chamber, whereby said braking elements are positively moved to engage said V-grooved surfaces by admission of fluid under pressure into said axially spaced chambers and the release of pressure fluid from said additional chamber and said braking elements being positively moved to disengage said V-grooved surfaces by admission of fluid under pressure into said additional chamber and release of fluid from said axially spaced chambers.

9. In a combined gear and brake structure, a fixed casing means having an axially extending circumferential inner surface, a first annular means, complemental means between said inner surface and the outer periphery of said annular means and mounting said annular means on said inner surface for axial movement only, a second annular means comprising a circumferentially complete, internally toothed gear having a portion extending radially outwards of the teeth, means for supporting said gear for rotary movement and for disposing the same closely adjacent said first annular means, said last-mentioned means including at least one component inside the casing radially inwards of said first annular means, the radial extent of said gear and the location of said component bearing such relationship to the radial extent of said first annular means that the outer periphery of said gear is inwardly of but adjacent said inner surface, while the teeth of said gear are inwardly of but adjacent the inner periphery of said first annular means so that both said annular means and gear are located at the inner circumference of the casing means, the respective facing surfaces of said annular means and gear having integral, shaped, complemental, interengaging friction surfaces thereon, additional annular means extending radially inwards from said inner surface and positioned adjacent to and opposite that face of said first annular means which is opposite the friction surface on said first annular means, said additional annular means being shaped to define in combination with said first annular means a pressure fluid-receiving chamber means, said casing means having at least one radial port therethrough terminating in communication with said chamber means at one end and at its other end externally of the casing means whereby introduction of fluid under pressure into said chamber means moves said first annular means axially in one direction and means for positively moving said first annular means axially in the opposite direction, whereby selected opposite axial movements of said first annular means selectively engages and disengages said friction surfaces.

10. A combined gear and brake structure as claimed in claim 9 and said gear including oppositely directed axially spaced surfaces, the friction surfaces on said gear comprising a series of circumferential V-grooves on said axially spaced surfaces, said gear being U-shaped in cross section and the V-grooved surfaces facing one another, said first annular means comprising a pair of annular braking elements mounted in back to back relationship between said V-grooved surfaces of the gear, the respective braking elements having similar V-grooved surfaces thereon and being movable away from one another to engage the respective V-grooved surfaces and toward one another to disengage said surfaces.

11. A combined gear and brake structure as claimed in claim 10 and said pressure fluid-receiving chamber means including the mutually adjacent surfaces of said braking elements.

12. A combined gear and brake structure as claimed in claim 11 and additional pressure fluid-receiving chamber means between the respective facing surfaces of said braking elements and said gear means and said casing means having additional radial ports therethrough in communication with said additional chamber means, whereby said braking elements are positively moved in both engaging and disengaging directions by admission of fluid under pressure into both said chamber means and additional chamber means.

13. A combined gear and brake structure as claimed in claim 9 in which said gear has oppositely facing axially spaced surfaces, said interengaging friction surfaces on the gear comprising a series of oppositely facing V-grooves on the respective axially spaced surfaces, said annular means comprising a pair of annular braking elements respectively disposed adjacent the respective V-grooved surfaces of the gear, each braking element having similar V-grooved surfaces thereon engageable with the V-grooved surfaces of the gear, and said braking elements being movable toward one another to engage the respective V-grooved surfaces and away from one another to disengage said V-grooved surfaces.

14. A combined gear and brake structure as claimed in claim 13 and said additional annular means comprising axially spaced abutments extending radially inwards of the casing a distance in excess of the radial extent of said braking elements and being shaped to slidably accommodate the respective braking elements and to define in combination therewith said chamber means so that there are at least two axially spaced fluid-receiving chambers, and said casing means having at least one radial port therethrough for each chamber.

15. A combined gear and brake structure as claimed in claim 14 and said braking elements having facing surfaces defining an additional pressure fluid-receiving chamber between the braking elements, and said casing means having at least one additional radial port therethrough terminating in communication with said additional chamber, whereby said braking elements are positively moved to engage said V-grooved surfaces by admission of fluid under pressure into said axially spaced chambers and the release of pressure fluid from said additional chamber and said braking elements being positively moved to disengage said V-grooved surfaces by admission of fluid under pressure into said additional chamber and release of fluid from said axially spaced chambers.

16. A combined gear and brake structure as claimed in claim 9 and the means for supporting said gear for rotary movement comprising an epicyclic gearing means inside the casing including a sun gear, planet gears in mesh with said sun gear, a carrier means for said planet gears and said planet gears being in mesh with the teeth on said internally toothed gear.

17. A combined gear and brake structure as claimed in claim 9 and the means supporting said gear for rotary movement comprising an epicyclic gearing means mounted for rotation within the casing including a sun gear means, planet carrier means, planet gear means on said planet carrier means and in engagement with said sun gear means and one of said three last-mentioned means being in toothed engagement with said internally toothed gear for rotatably supporting the same.

References Cited in the file of this patent

UNITED STATES PATENTS

| | | |
|---|---|---|
| 506,517 | Leibert | Oct. 10, 1893 |
| 2,289,991 | Paxman | July 14, 1942 |
| 2,333,682 | Schneider | Nov. 9, 1943 |
| 2,558,738 | Davis et al. | July 3, 1951 |
| 2,684,737 | Johansson | July 27, 1954 |

FOREIGN PATENTS

| | | |
|---|---|---|
| 995,958 | France | Dec. 11, 1951 |
| 69,609 | Netherlands | Mar. 15, 1952 |